(12) United States Patent
Sawada

(10) Patent No.: US 8,532,378 B2
(45) Date of Patent: Sep. 10, 2013

(54) IMAGING DEVICE, METHOD OF ADJUSTING COLOR SHIFT OF DISPLAY MONITOR AND COLOR SHIFT ADJUSTER OF DISPLAY MONITOR

(75) Inventor: Takahiro Sawada, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 236 days.

(21) Appl. No.: 13/178,923

(22) Filed: Jul. 8, 2011

(65) Prior Publication Data
US 2012/0008863 A1     Jan. 12, 2012

(51) Int. Cl.
*G06K 9/00* (2006.01)

(52) U.S. Cl.
USPC ......................................................... 382/167

(58) Field of Classification Search
USPC .................. 382/162–167, 232, 254, 270–275;
348/207.99, 672–673, 687; 358/1.9, 2.1,
358/516, 518–520; 345/88, 102; 362/97.1;
396/439, 535, 541
See application file for complete search history.

(56) References Cited

U.S. PATENT DOCUMENTS

| | | | | |
|---|---|---|---|---|
| 7,630,574 B2* | 12/2009 | Yamada | .......................... | 382/273 |
| 7,982,910 B2* | 7/2011 | Ishiguchi | ........................ | 358/1.9 |
| 7,983,557 B2* | 7/2011 | Misawa et al. | ................. | 396/541 |
| 8,411,022 B2* | 4/2013 | Brown et al. | ................... | 345/102 |
| 2005/0062876 A1* | 3/2005 | Okutani et al. | ................ | 348/371 |
| 2006/0268159 A1* | 11/2006 | Orimoto et al. | ................ | 348/373 |
| 2007/0268371 A1* | 11/2007 | Misawa et al. | ............ | 348/207.99 |
| 2009/0122230 A1 | 5/2009 | Ochiai | | |
| 2011/0102668 A1* | 5/2011 | Kaga et al. | ...................... | 348/374 |

FOREIGN PATENT DOCUMENTS

| | | |
|---|---|---|
| JP | 2001-257921 | 9/2001 |
| JP | 2009-123489 | 6/2009 |
| JP | 2011-99949 | 5/2011 |
| JP | 2011-120205 | 6/2011 |
| WO | WO 2011/055858 A1 | 5/2011 |

* cited by examiner

*Primary Examiner* — Jose Couso
(74) *Attorney, Agent, or Firm* — Oblon, Spivak, McClelland, Maier & Neustadt, L.L.P.

(57) ABSTRACT

An imaging device includes a camera unit having an imaging element in which subject light which has passed through a shooting optical system is formed to output an image signal, a main body unit from which the camera unit is detachable, the main body unit having a display monitor displaying a subject image on a screen by input image data in which the image signal is processed, and a communication unit which enables bidirectional communication of the camera unit and the main body unit in a state in which the camera unit is removed from the main body unit.

11 Claims, 9 Drawing Sheets

IMAGING DEVICE, METHOD OF ADJUSTING COLOR SHIFT OF DISPLAY MONITOR AND COLOR SHIFT ADJUSTER OF DISPLAY MONITOR

PRIORITY CLAIM

The present application is based on and claims priority from Japanese Patent Application No. 2010-157575, filed on Jul. 12, 2010, the disclosure of which is hereby incorporated by reference in its entirety.

BACKGROUND

1. Technical Field

The present invention relates to an imaging device, a method of adjusting color shift of a display monitor in an imaging device and a color shift adjuster of a display monitor.

2. Description of the Related Art

A liquid crystal display (hereinafter, referred to as an LCD) is widely used as an image display monitor of an imaging device such as a digital camera. The LCD represents colors based on the three primary colors of red, green and blue, and achieves a wide range of color reproducibility.

In a conventional display monitor, due to optical properties of a light guiding plate, a reflection plate, a color filter or the like, optical properties of an LED light source for use as backlight, or the like, colors of a subject image to be actually displayed on an LCD may be varied or shifted with respect to a subject image which is obtained when image input data is displayed on the LCD by truly reproducing the image input data.

If such a color shift occurs on an LCD, even if image information (red: 255, green: 255, blue: 255) corresponding to the brightest white of 256 gradation, for example, is input to a display monitor as image input data, such that a white image is displayed on the screen of the LCD, the white image becomes a yellowish white image, a reddish white image or the like.

A recent digital camera includes white balance, which adjusts an image displayed on a screen by a user while viewing the image on the screen, such that a shot white image, for example, white paper is displayed as a white object.

However, if such white balance is performed in a state in which colors are shifted on the LCD screen, extra white balance is performed by the color shift on the LCD, so that the color shift between the colors of the actual subject image and the colors of the image displayed on the LCD is not corrected. In this case, the white balance is not effectively performed. Even if a white image is displayed on the LCD screen, the image becomes a yellowish image or a reddish image if the image is displayed on a screen of a personal computer or the image is printed by a printer.

In order to improve such a color shift on a screen of an LCD, Japanese Patent Application Publication No. 2009-123489 discloses an invention in which a chromaticity range of illumination light is set within a target chromaticity range by combining a plurality of LED light sources each having a different chromaticity.

However, even if the color shift on the screen of the display monitor of the digital camera is adjusted before shipment, the color shift may occur due to some reasons after the shipment, for example, time degradation. The above-described prior art can not resolve such a problem.

SUMMARY

Consequently, the present invention aims to provide an imaging device in which a user can easily adjust color shift on a screen of a display monitor even after shipment, a method of adjusting color shift of a display monitor and a color shift adjuster of a display monitor.

The present invention focuses on a camera unit being removable from a main body unit, and is configured to display an adjusting image which becomes a reference of color adjustment on a screen of a display monitor provided in the main body unit, to analyze an image signal obtained by imaging the screen, and to determine color shift based on the analysis result and a white brightness display data for displaying the adjusting image One embodiment of the present invention provides an imaging device, comprising: a camera unit having an imaging element in which subject light which has passed through a shooting optical system is formed to output an image signal; a main body unit from which the camera unit is detachable, the main body unit having a display monitor displaying a subject image on a screen by input image data in which the image signal is processed; and a communication unit which enables bidirectional communication of the camera unit and the main body unit in a state in which the camera unit is removed from the main body unit, at least one of the camera unit and the main body unit, including: a mode setting unit configured to set an adjustment mode which adjusts color shift of the subject image displayed on the screen; an adjusting image data output controller configured to output white brightness display data to the display monitor as the image data when the adjustment mode is set by the mode setting unit; a color information analyzer configured to analyze color information based on the image signal obtained from the imaging element by shooting an adjusting image displayed on the screen based on the white brightness display data by the camera unit; and a light emitting brightness adjuster configured to adjust RGB light emitting brightness of the display monitor based on an analysis result of the color information analyzer so as to solve color shift on the screen.

One embodiment of the present invention also provides a method of adjusting color shift of a display monitor in an imaging device including a camera unit having an imaging element in which subject light which has passed through a shooting optical system is formed to output an image signal, and a main body unit from which the camera unit is detachable, the main body unit having a display monitor displaying a subject image on a screen by input image data in which the image signal is processed, the method, comprising the steps of: displaying a color shift adjusting image on the screen by outputting previously set white brightness display data on the screen of the display monitor; imaging a color shift adjusting image displayed on the screen by the camera unit; analyzing color information based on the image signal obtained from the imaging element which shoots the adjusting image; and adjusting RGB light emitting brightness of the display monitor so as to solve the color shift of the subject image which is displayed on the screen based on an analysis result of the color information.

One embodiment of the present invention also provides a color shift adjuster of a display monitor in an imaging device including a camera unit having an imaging element in which subject light which has passed through a shooting optical system is formed to output an image signal, a main body unit from which the camera unit is detachable, the main body unit having a display monitor displaying a subject image on a screen by input image data in which the image signal is processed, and a communication unit which enables bidirectional communication of the camera unit and the main body unit in a state in which the camera unit is removed from the main body unit, the color shift adjuster, comprising: an adjusting image data output controller configured to display an adjusting image on the screen by outputting previously set white brightness display data on the display monitor in color shift adjustment; a color information analyzer configured to analyze color information based on the image signal obtained from the imaging element by shooting the adjusting image with the camera unit; and a light emitting brightness adjuster configured to adjust RGB light emitting brightness of the display monitor so as to solve color shift of the subject image which is displayed on the screen based on analysis result of the color information by the color information analyzer.

BRIEF DESCRIPTION OF THE DRAWINGS

The accompanying drawings are included to provide further understanding of the invention, and are incorporated in and constitute a part of this specification. The drawings illustrate an embodiment of the invention and, together with the specification, serve to explain the principle of the invention.

FIG. 1A illustrates an example in which a first camera unit 1 is mounted on a main body unit 2; and FIG. 1B illustrates an example in which a second camera unit 1' is mounted on the main body unit 2.

FIG. 5A illustrates an adjusting image Ga for use in Embodiment 1; and FIG. 5B illustrates an adjusting image Gb for use in another example.

FIG. 6A illustrates the entire XYZ color system chromaticity; and FIG. 6B illustrates the major part thereof.

DETAILED DESCRIPTION OF THE PREFERRED EMBODIMENT

Hereinafter, an embodiment of the present invention will be described with reference to the drawings.

Embodiment 1

FIG. 1 illustrates a camera system 3 of Embodiment 1 as one example of an imaging device having a color shift adjuster.

Referring to FIG. 1, the camera system 3 includes a main body unit 2 and a first camera unit 1 or a second camera unit 1' which is removable from a mounted part 2A of the main body unit 2.

Figure 1A:
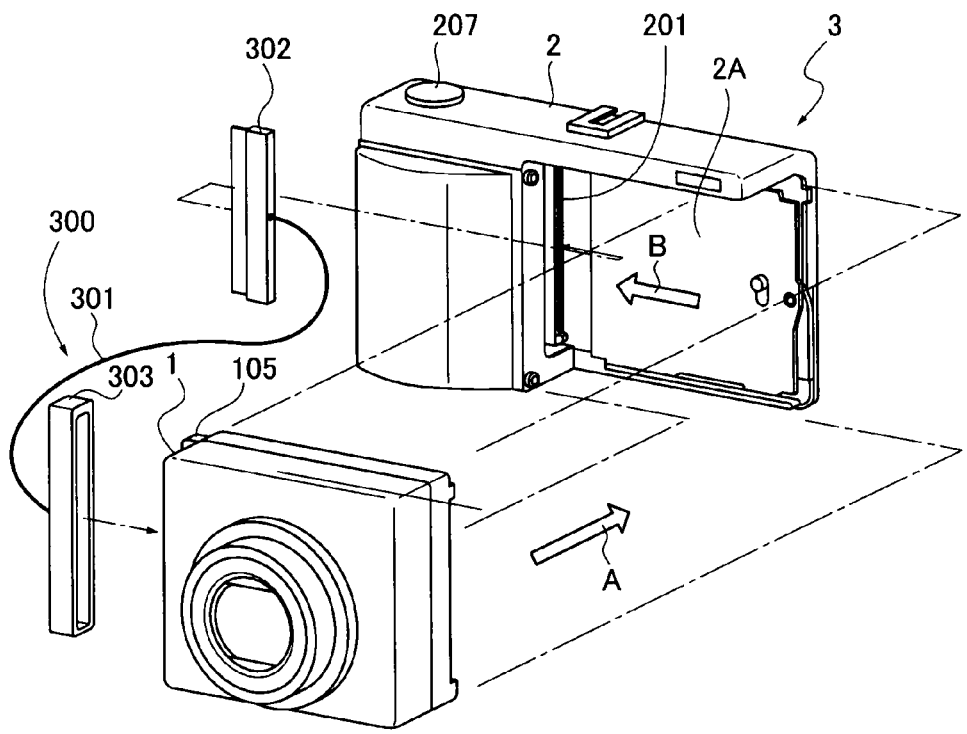
FIGS. 1A, 1B are perspective views each illustrating a camera system 3 of Embodiment 1 as one example of an imaging device having a color shift adjuster.
Figure 1B:
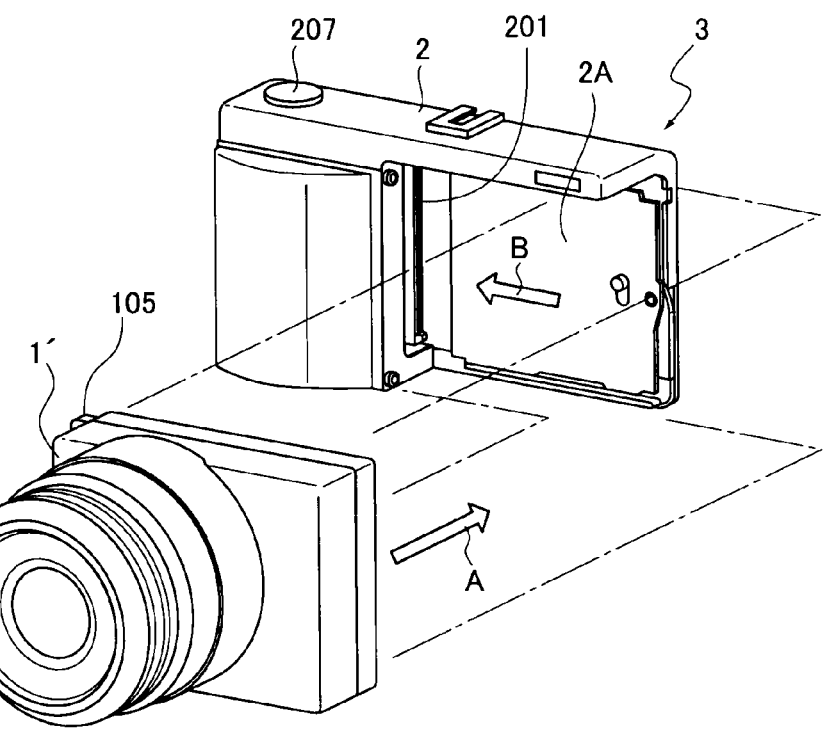

The first camera unit 1 illustrated in FIG. 1A has an optical zoom function and the second camera unit 1' illustrated in FIG. 1B has a single focus lens. Each of the camera units 1, 1' serves as an imaging device together with the main body unit 2. The camera unit is not limited to the camera units 1, 1'. Various types of camera units can be used. A user can appropriately selects a camera unit from various types, and the selected camera unit is mounted on the mounted part 2A of the main body unit 2.

Each of the camera units 1, 1' can be mounted by sliding in the arrow B direction after being pressed to the main body unit 2 in the optical axis direction as the arrow A direction. Moreover, each of the camera units 1, 1' can be removed by sliding in the lateral direction opposite the arrow B direction after being pressed in the arrow A direction. The details of the removable configuration are omitted (regarding the specific configuration, refer to Japanese Patent Application Publication Nos. 2011-099949 and 2011-120205 by the present inventor).

Next, the configuration of the camera system 3 of Embodiment 1 will be described with reference to FIG. 2. In addition, in the following description, the first camera unit 1 is described as a typical example of a camera unit which is connected to the main body unit 2 of the camera system 3.

Figure 2:
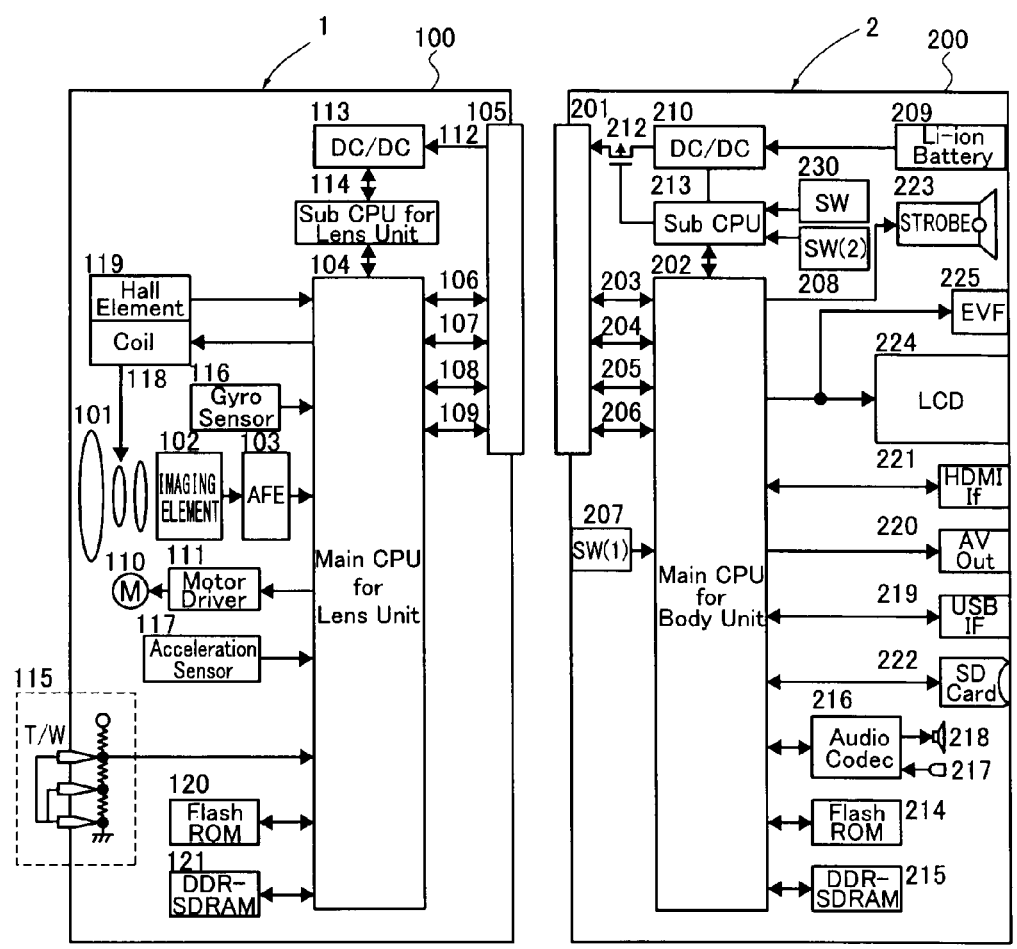
FIG. 2 is a block diagram illustrating a configuration of the camera system 3 of Embodiment 1.

FIG. 2 is a view illustrating functional blocks of the main body unit 2 and the first camera unit 1 constituting the camera system 3 of Embodiment 1.

Referring to FIG. 2, a camera unit portion 100 which is a functional block of the first camera unit 1 includes a lens group 101 as a shooting optical system having a focus lens, an imaging element 102, which converts a subject image in which subject light is imaged through the lens group 101 into electric signals from optical signals, and outputs the electric signals, an AFE (analogue front end) which converts image signals (analogue image data) output from the imaging element 102 into digital image data, so as to amplify the signals, and a CPU 104 as an image engine which performs a predetermined image process on converted digital image data such as a conversion process to YUV data, a JEPEG compression process, a producing process of RAW data or the like.

The camera unit portion 100 includes a joint connector 105 constituting an interface between units, which electrically connects to the main body unit 2, and a signal line which receives each of a bidirectional bus 106 which sends image data to the main body unit 2 through the joint connector 105, a control signal 107, a serial interface signal 108 and an SDIO signal 109.

The camera unit portion 100 includes a motor driver 111 which controls a motor 110 for use in the extending and the housing of a lens barrel of the lens group 101. This motor driver 111 is controlled by the control signal 107 received from the main body unit 2. By this mechanism, various operations, which house the lens barrel when the power source of the camera system 3 is turned off in accordance with types of an interchangeable lens, change a magnification by pressing a not shown button and the like, can be controlled.

The camera unit portion 100 includes a DC-DC convertor 113 which generates various power required for the operation of the camera unit portion 100 from a power 112 to be supplied from the main body unit 2, a sub-microcomputer 114 which controls the DC-DC convertor 113 by detecting the power 112 supplied from the main body unit 2, and a detection circuit 115 which detects a teleconvertor lens and a wideconvertor lens removable to the outside of the camera unit portion 100.

The camera unit portion 100 includes a gyro sensor 116 which detects inclination of the camera system 3, an acceleration sensor 117 which detects acceleration to be added to the camera system 3, a coil 118 which drives the lens group 101 by the acceleration detected by the acceleration sensor 117 and the inclination detected by the gyro sensor 116 and a Hall element 119 which detects the driving amount of the coil 118. These gyro sensor 116, acceleration sensor 117, coil 118 and Hall element 119 serve as a camera shake prevention function.

Software which performs an image process and an operation control process is stored in a flash ROM 120. The CPU 104 controls the operation and the process of each mechanism by using a RAM 121 of a work area.

A main body unit portion 200 which is a functional block of the main body unit 2 includes a joint connector 201 constituting an interface between units, which electrically connects to the joint connector 105 of the camera unit portion 100, a bidirectional bus 203 which transmits the image data received from the camera unit portion 100 through the joint connector 201 to a CPU 202, the CPU 202 as an image engine which appropriately performs a conversion process to YUV data, a JPEG format compression process, a development process from a JEPEG format, a generation process of RAW data or the like with respect to the image data received through the bidirectional bus 203, a line of a control signal 204 which connects to the line of the control signal 107 of the camera unit portion 100, a line of a serial interface signal 205 which connects to the line of the serial interface signal 108 of the camera unit portion 100 and a line of an SDIO signal 206 which connects to the line of the SDIO signal 109 of the camera unit portion 100.

The main body unit portion 200 includes a focus and release switch (hereinafter, referred to as a release switch) 207 which starts a shooting operation of the camera system 3 by a predetermined pressing operation, a switch 208 including a cross key for use in the selecting and the setting of the operation mode of the camera system 3 which is set in the main body unit portion 200, a sub-microcomputer 213 which performs a predetermined setting process by detecting the input of the switch 208, controls the power to be supplied from a lithium ion buttery 209 by using a DC-DC convertor 210, and controls a power source switch 212 for supplying power to the camera unit portion 100, and a power source switch 230 which switches the activation and the stoppage of the camera system 3.

The main body unit portion 200 includes a flash ROM 214 in which software for performing an image process and an operation control process are stored. The CPU 202 controls the operation and the process of each mechanism by using an SDRAM 215 of a work area.

The main body unit portion 200 includes an audio codec 216, a microphone 217 which inputs an audio signal to the audio codec 216, a speaker 218 which outputs audio from the audio codec 216, a USB interface connector 219, a connector 220 for AV output, an output interface 221 of an HDMI signal, a SD memory 222 which is a removable memory for storing a shot image file, a strobe 223 as a connection circuit when mounting an external strobe to the main body unit portion 200, a display monitor (LCD) 224 which displays a subject image in focusing by the operation of the release switch 207, and displays the shot image data in the shooting operation and an EVF (Electrical View Finder) 225.

Figure 3:
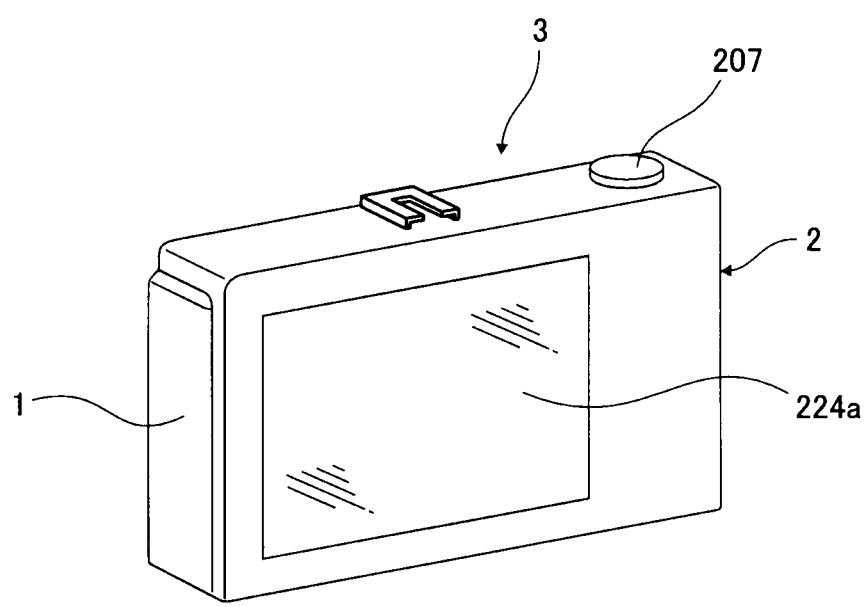
FIG. 3 is a perspective view illustrating a back side of the camera system 3.

In addition, a screen 224a of the display monitor 224 is provided on the back side of the main body unit 2 as illustrated in FIG. 3.

Next, a feature and a configuration of Embodiment 1 will be described.

Both of the joint connectors 105, 201 are mechanically connected when the first camera unit 1 is mounted on the main body unit 2, and include a communication device which enables wired or wireless bidirectional communication in a state in which the first camera unit 1 is separated from the main body unit 2.

In Embodiment 1, as the communication device, a connection cable 300 illustrated in FIG. 1A is used. This connection cable 300 includes a cable 301 and connectors 302, 303 which are connected to both ends of the connection cable 301, and mechanically connected to the joint connectors 105, 201, respectively. The connection cable 300 supplies power to the first camera unit 1 from the main body unit 2. As the communication device, a wireless device having a receiver-transmitter, which performs bidirectional receiving and transmitting by using infrared light, for example, and is provided in each joint connector 105, 201, can be used instead of using the connection cable 300. In this case, a power source can be independently mounted on each camera unit 1, 1', or can be mounted only on the main body unit 2 if power can be supplied between the receiver-transmitters of the wireless communication.

A user can perform color shift adjustment which controls color shift if color shift occurs on the display monitor 224 after shipment. Hereinafter, a color shift adjustment process which is performed in this color shift adjustment will be described with reference to the flow chart of FIG. 4.

The color shift adjustment process is performed by both of the CPUs 104, 202 or any one of the CPUs 104, 202.

When performing the color shift adjustment process, at first, a user removes the first camera unit 1 from the main body unit 2, and then, connects each of the connectors 302, 303 of the connection cable 300 to each of the joint connectors 105, 201 of the units 1, 2, respectively.

Figure 4:
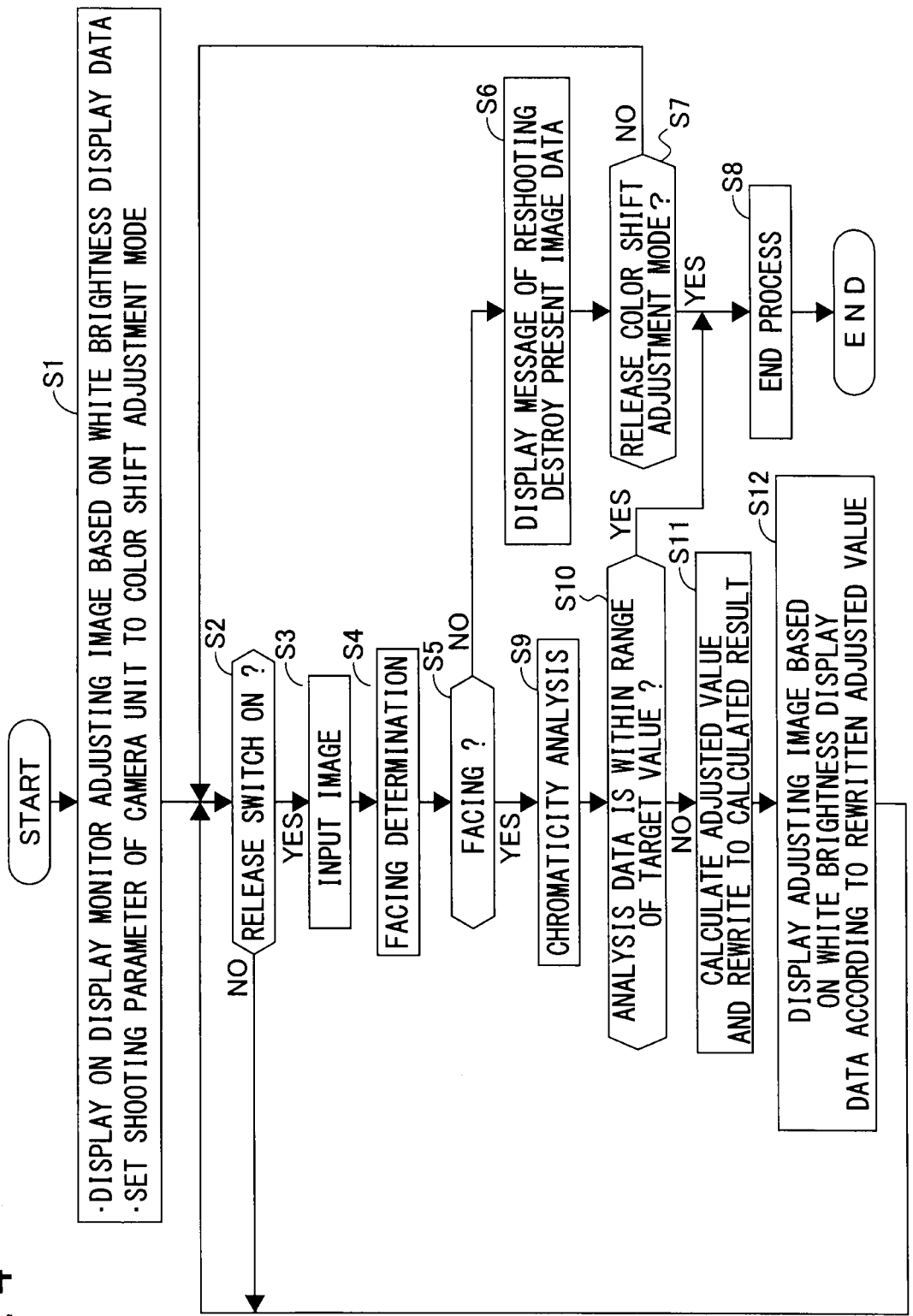
FIG. 4 is a flow chart illustrating a flow of processes which are performed in the camera system 3 in color shift adjustment.

Thereafter, the user turns on the power source switch 230 of the main body unit 2, and selects a menu of a color shift adjustment mode from a menu screen displayed on the display monitor 224 by the switch 208, so that the color shift adjustment process illustrated in the flow chart of FIG. 4 is started. A configuration which sets this adjustment mode is a mode setting device.

In this color shift adjustment process, the adjusting image Ga based on the previously stored white brightness display data is displayed on the screen 224a of the display monitor 224, and shooting parameters of the camera unit 1, for example, ISO sensitivity, exposure and shutter speed are switched to the previously stored color shift adjustment mode setting in Step S1. In addition, the configuration which outputs the adjusting image Ga is an adjusting image data output controller.

Figure 5A:
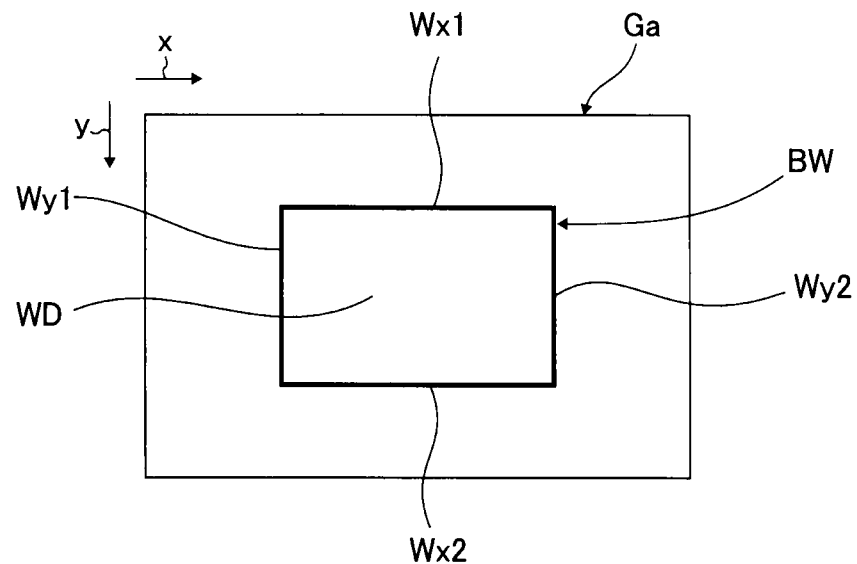
FIGS. 5A, 5B are front views each illustrating a state in which an adjusting image is displayed on a screen 224a of a display monitor 224.
Figure 5B:
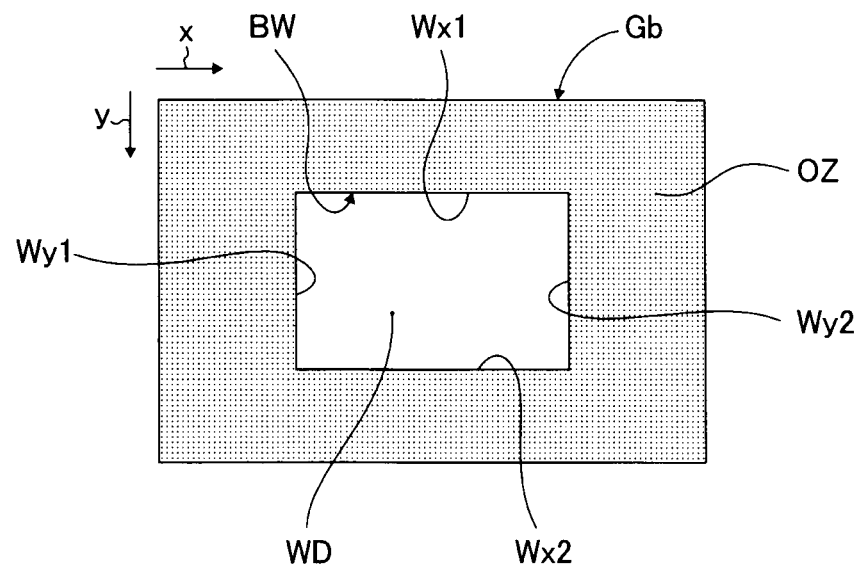

FIG. 5A is a front view illustrating a state in which the adjusting image Ga is displayed on the screen 224a of the display monitor 224 and FIG. 5B is a front view illustrating a state in which another adjusting image Gb is displayed on the screen 224a of the display monitor 224.

The adjusting image Ga includes a black frame BW and a white brightness image WD.

As illustrated in FIG. 5A, the black frame BW is a square frame by horizontal frames Wx1, Wx2 each of which extends in the horizontal direction (arrow x direction) of the screen 224a as a parallel line pattern and longitudinal frames Wy1, Wy2 each of which extends in the arrow y direction orthogonal to the arrow x direction as a parallel line pattern. Each frame Wx1, Wx2, Wy1, Wy2 can be displayed by a line as illustrated in FIG. 5A, or can be displayed by an inner circumference edge of a monotone or black outer circumference display image OZ as illustrated in FIG. 5B.

The white brightness image WD inside the black frame BW is displayed based on white brightness display data.

Figure 6A:
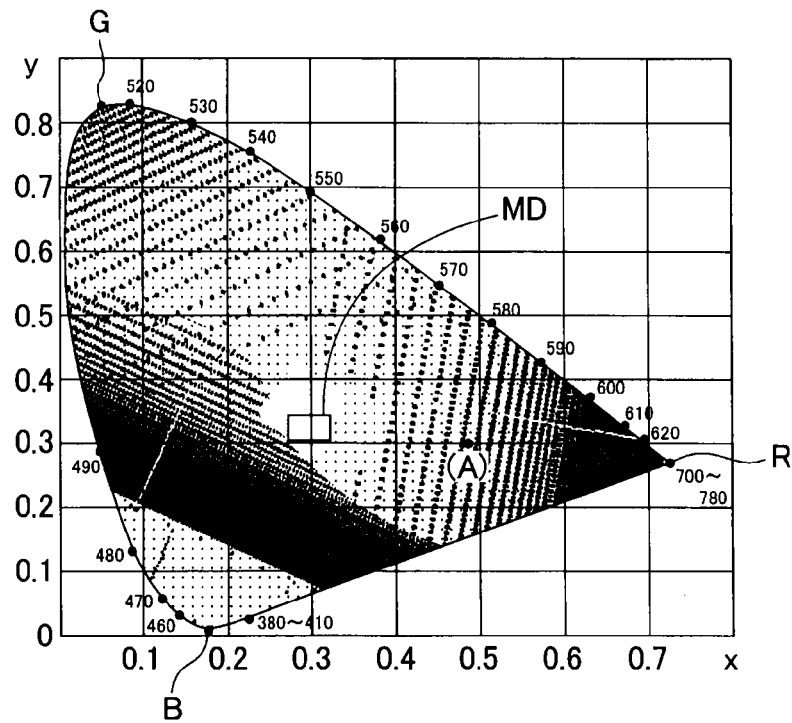
FIGS. 6A, 6B are XYZ color system chromaticity diagrams each describing white brightness display data displaying a white brightness image WD.

The white brightness display data is an area illustrated by MD in the XYZ color system chromaticity diagram of FIGS. 6A, 6B, and is data illustrating "white" corresponding to the center WP of the area illustrated by TG in FIG. 6B (hereinafter, the area illustrated by TG is referred to as a target area and the point illustrating "white" is referred to as a white point WP). In FIG. 6A, R denotes red, B denotes blue and G denotes green.

Figure 6B:
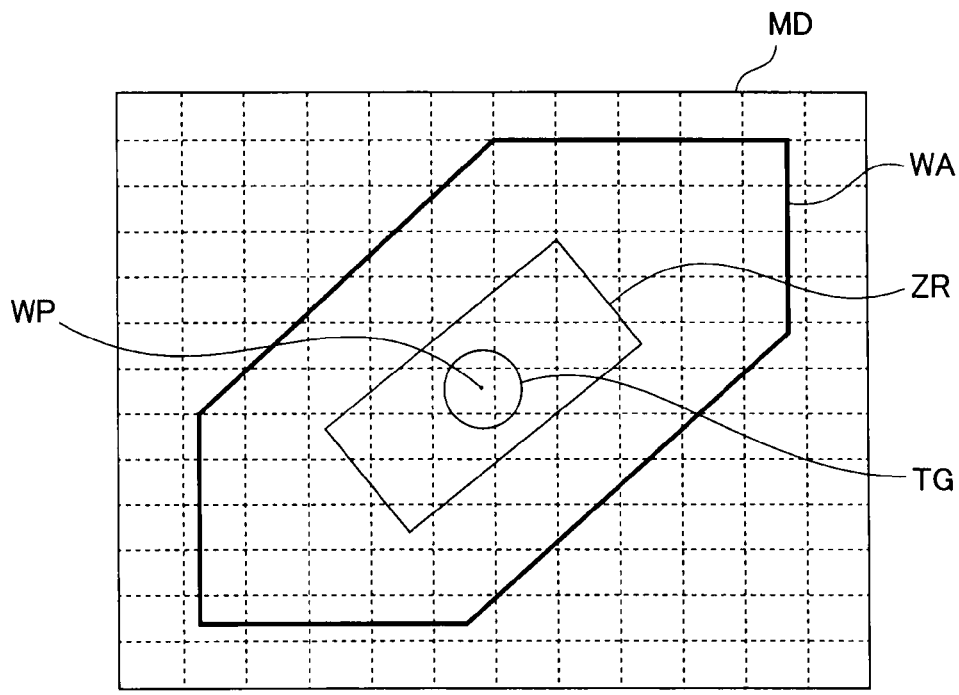

In FIG. 6B, the area illustrated by WA illustrates an allowable area which is recognized as white (hereinafter, this area is referred to as the allowable area WA). The end of this allowable area WA is the last level which can be visually recognized as "white". In Embodiment 1, if the chromaticity of "white" which should be within the target area TG is shifted in the area ZR as one example, the chromaticity is adjusted to be within the target area TG.

Returning to FIG. 4, it is determined whether the release switch 207 is pressed or not in Step 2. If the release switch 207 is pressed, the flow moves onto the next Step 3. If the release switch 207 is not pressed, the determination in Step 2 is repeated.

After inputting the image shot by the first camera unit 1 in Step 3, the flow moves onto Step 4. In this case, in order to adjust the color shift, after a user turns on the power source switch 230 of the main body unit 2, a user disposes the first camera unit 1 in front of the screen 224a of the display monitor 224 of the main body unit 2, and shoots the adjusting image Ga displayed on the display monitor 224. The pressing of the release switch 207 in Step 2 is determined by the pressing operation of a user. The image input in Step 3 is the adjusting image Ga shot by the first camera unit 1 in accordance with the pressing of the release switch 207 by a user.

In this shooting, it is preferable for a user to press the release switch 207 in a state in which the first camera unit 1 faces the screen 224a of the display monitor 224 and the first camera unit 1 nearly has contact with the screen 244a of the display monitor 224.

In Step 4, it is determined whether or not the first camera unit 1 faces the display monitor 224 of the main body unit 2 based on the image input in Step 3. If the first camera unit 1 faces the display monitor 224 in Step 5, the flow moves onto Step 9, and if the first camera unit 1 does not face the display monitor 224, the flow moves onto Step 6. In addition, the configuration which performs this facing determination corresponds to a facing determination device.

The details of the facing determination of Step 4 will be described with reference to FIGS. 7-11.

FIGS. 7-10 are views each illustrating the image signals of the adjusting image Ga shot by the imaging element 102 of the first camera unit 1 as a reproduced image on the screen 224a. These reproduced images are, in fact, signal-processed without displaying on the screen 224a. The image signal on the imaging element 102 corresponding to each frame Wx1, Wx2, Wy1, Wy2 of the black frame BW displayed on the screen 244a is illustrated by adding'.

Twice scanning is preformed in each of the orthogonal X-axis and Y-axis directions relative to the image signals in the imaging element 102 in the facing determination. In Embodiment 1, with the upper left corner portion of the reproduced image of the imaging element 102 of the first camera unit 1 as the origin, coordinates in which the value of the X-axis is increased in the right direction from the origin and the value of Y-axis is increased in the lower direction are given.

Referring to FIGS. 7-10, the arrow X1 illustrates the first scanning in the X-direction, which is referred to as the X-direction first scanning, and the arrow X2 illustrates the second scanning in the X-direction, which is referred to as the X-direction second scanning. Similarly, in each figure, the arrow Y1 illustrates the first scanning in the Y-direction, which is referred to as the Y-direction first scanning, and the arrow Y2 illustrates the second scanning in the Y-direction, which is referred to as the Y-direction second scanning. As described above, the X-direction second scanning is performed at an interval in the Y-direction, and the Y-direction second scanning is performed at an interval in the X-direction.

Moreover, by the X-direction first scanning, the edge coordinates x01 in the left side longitudinal frame Wy1' are detected and the edge coordinates x02 in the right side longitudinal frame Wy2' are detected. By the X-direction second scanning, the edge coordinates x03 in the left side longitudinal frame Wy1' are detected and the edge coordinates x04 in the right side longitudinal frame Wy2' are detected.

Furthermore, by the Y-direction first scanning, the edge coordinates y01 in the upper side lateral frame Wx1' are detected and the edge coordinates y02 in the lower side lateral frame Wz2' are detected. By the Y-direction second scanning, the edge coordinates y03 in the upper side lateral frame Wx1' are detected and the edge coordinates y04 in the lower side lateral frame Wx2' are detected.

The following expressions 1, 2 are calculated based on each of the coordinates x01, x02, x03, x04, y01, y02, y03, y04. If the obtained calculation values are less than the facing determination values Xh, Yh, which are 0 or very close to 0, it is determined as facing.

$$|(x02-x01)-(x04-x03)|<Xh \qquad \text{Expression 1}$$

$$|(y02-y01)-(y04-y03)|<Yh \qquad \text{Expression 2}$$

Figure 7:
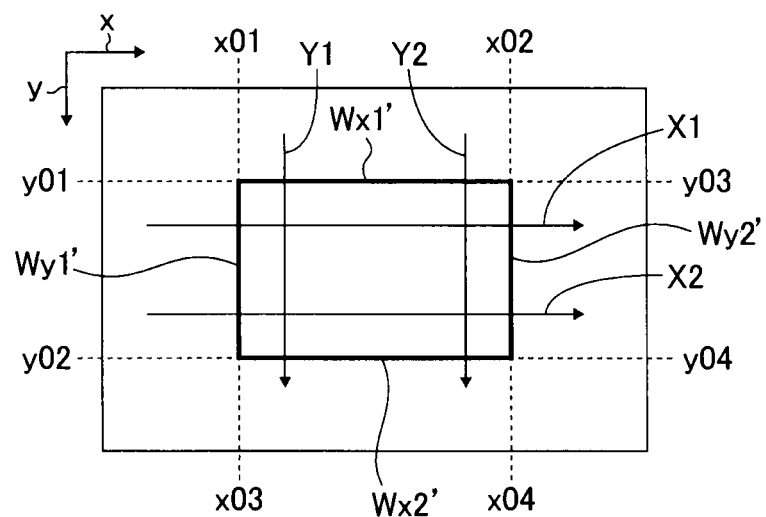
FIG. 7 is a view illustrating a reproduced image when image signals of the adjusting image Ga shot by an imaging element 102 of the first camera unit 1 are reproduced on the screen 224a, and illustrating one example of a reproduced image in facing.
Figure 8:
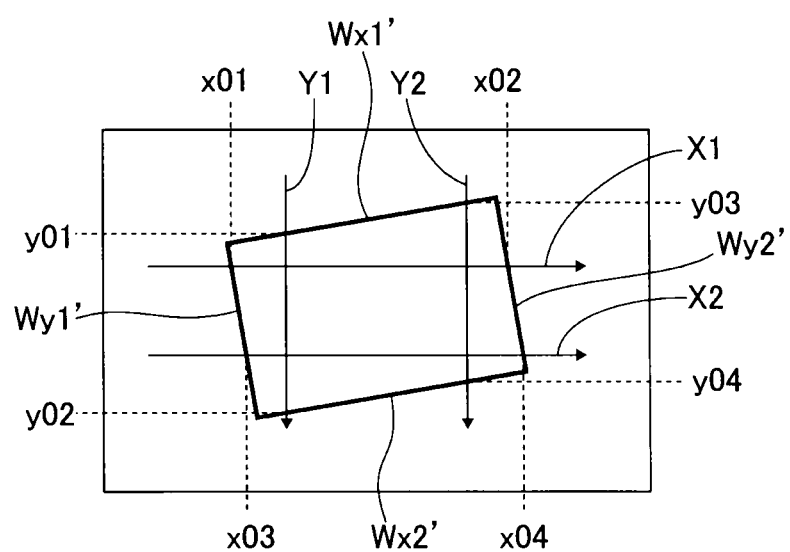
FIG. 8 is a view illustrating a reproduced image when image signals of the adjusting image Ga shot by the imaging element 102 of the first camera unit 1 are reproduced on the screen 244a, and illustrating one example of the reproduced image in facing.

Namely, the first camera unit 1 faces the screen 224a of the display monitor 224 of the main body unit 2. More specifically, if the optical axis of the lens group 101 is orthogonal to the screen 224a, the shot adjusting image Ga becomes as illustrated in FIG. 7 or FIG. 8. In FIG. 7, the outer frame of the imaging element 102 is parallel to the outer frame of the screen 224a. FIG. 8 illustrates a state in which both of the units 1, 2 relatively rotate about the optical axis from the state illustrated in FIG. 7.

In each of the examples illustrated in FIGS. 7, 8, the calculation result of Expression 1=the calculation result of Expression 2=0, and it is determined as facing.

Figure 9:
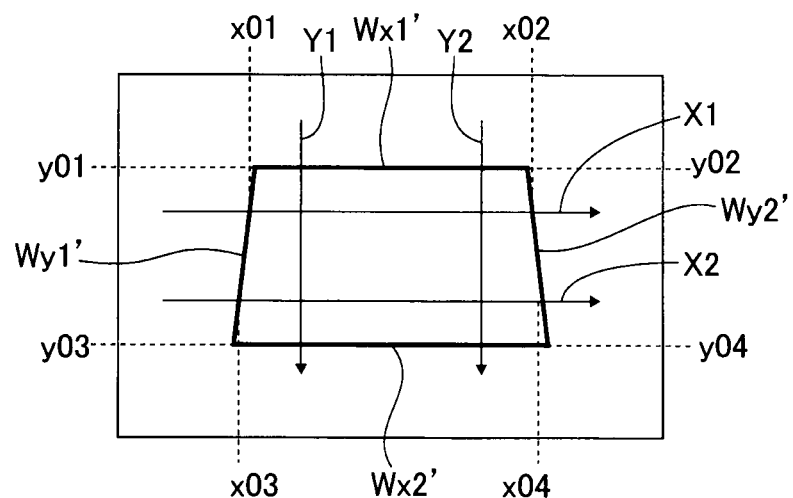
FIG. 9 is a view illustrating a reproduced image when image signals of the adjusting image Ga shot by the imaging element 102 of the first camera unit 1 are reproduced on the screen 224a, and illustrating one example of the reproduced image in non-facing.

Meanwhile, FIG. 9 illustrates a shot image in which the shooting distance in the portion facing the downside of the display monitor 224 is shorter than the shooting distance in the portion facing the upside of the display monitor 224, so that the optical axis of the first camera unit 1 inclines upwardly to the display monitor 224, and the first camera unit 1 does not face the display monitor 224.

In this case, the calculation result of Expression 1>Xh and the calculation result of Expression 2=0. Accordingly, it is determined that the first camera unit 1 does not face the display monitor 224.

Figure 10:
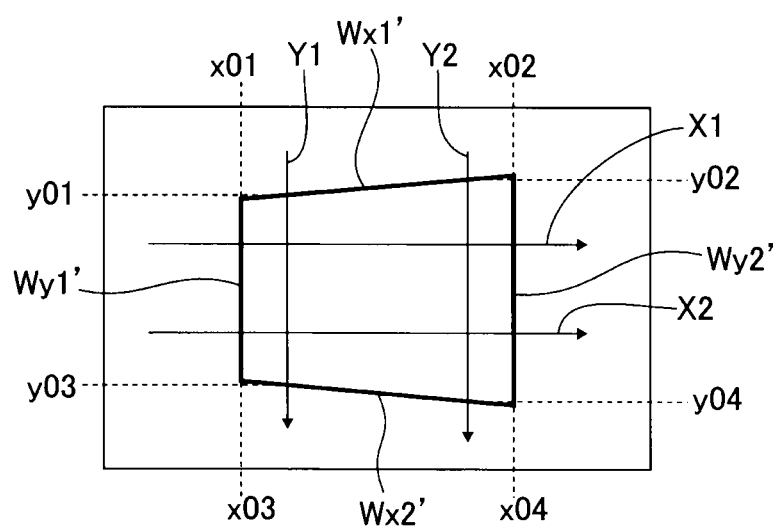
FIG. 10 is a view illustrating a reproduced image when image signals of the adjusting image Ga shot by the imaging element 102 of the first camera unit 1 are reproduced on the screen 224a, and illustrating one example of the reproduced image in non-facing.

FIG. 10 illustrates a shot image in which the shooting distance in the portion facing the right side of the display monitor 224 is shorter than the shooting distance in the portion facing the left side of the display monitor 224, so that the optical axis of the first camera unit 1 inclines in the right direction to the display monitor 224, and the first camera unit 1 does not face the display monitor 224.

In this case, the calculation result of Expression 1=0 and the calculation result of Expression 2>Yh0. Accordingly, it is determined that the first camera unit 1 does not face the display monitor 224.

Figure 11:
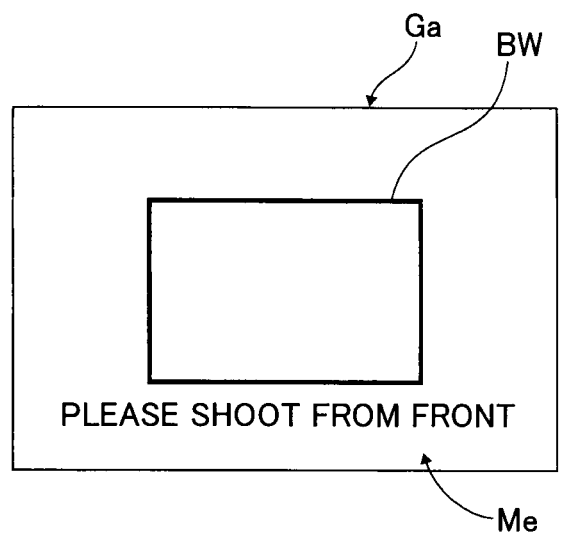
FIG. 11 is a view illustrating a state in which a message Me indicating reshooting is displayed on the screen 224a of the display monitor 224.

Returning to FIG. 4, if it is determined that the first camera unit 1 does not face the display monitor 224 in Step 5, the flow moves onto Step 6. In Step 6, the message Me indicating reshooting as illustrated in FIG. 11 is displayed on the screen 224a of the display monitor 224, and the flow moves onto Step 7 after deleting the shot image data input in Step 3.

The facing determination values Xh, Yh which determine whether the first camera unit 1 faces the display monitor 224 or not are set to values having the most suitable allowable range according to the set viewing direction, the viewing angle, and the specs of the display monitor 224 (TFT liquid crystal, organic EL or the like). In general, since the center of the viewing direction of the digital camera is often set in the upper direction from the state in which the first camera unit 1 faces the display monitor 224, in view of the setting of the center of the viewing direction, it is preferable to increase the allowable range when it is determined that the shooting is performed from the upside and it is preferable to decrease the allowable range when it is determined that the shooting is performed from the downside.

In this case, although it depends on the specs of the display monitor 224, about ±20° from the set viewing direction is an allowable range in a generally used TFT liquid crystal, but it is desirable to perform about ±10° from the viewing direction in this color shift adjustment.

Moreover, the number of pixels which can be displayed on the display monitor 224 is generally less than the number of pixels of the imaging element 102. For this reason, in the monitor display state which views the through image before and after the shooting, the data in which the shot image is thinned out is transferred and displayed. Therefore, the time required for the determination can be reduced by analyzing the pattern of the black frame BW from the small data amount.

In Step 7, it is determined whether or not the color shift adjustment mode is released. If the color shift adjustment mode is not released, the processes from Step 2 are repeated. If the color shift adjustment mode is released, the color shift adjustment is completed after performing the end process in Step 8. The end process of Step 8 will be described later.

After Step 9, the shift of the white point WP is calculated and the adjusted value for correcting the shift amount is calculated.

In this case, in Step 9, the analysis data in which the chromaticity of the white brightness image WD inside the black frame BW in the input image is analyzed is obtained, and then, the flow moves onto Step 10. The image for use in this process can be the image input in Step 3, but an image shot and input again at this point is used in Embodiment 1. In addition, the portion which performs the process of Step 9 corresponds to the color information analyzer.

In Step 3, the image in a focused state is obtained by the first camera unit 1 in order to perform the facing determination based on the back frame BW. In contrast, in this Embodiment 1, an image in a defocused state of the first camera unit 1 is used for the shot image for use in the chromaticity analysis. In addition, the shooting can be performed by the instruction with the output such as sound to a user or can be automatically performed based on the control.

The shooting in a defocused state is performed for the following reason.

The display monitor 224 for use in Embodiment 1 includes R, G, B light emitting points and the imaging element 102 includes R, G, B or the complementary color sensitivity with respect to each pixel. When the imaging element 102 loads the image data, the output may extremely fluctuate by the relationship between the position of the color of the light emitting point of the display monitor 224 and the position of the pixel of the imaging element 102 in a state focused on the screen 224a. When the pixel having R sensitivity is received only from the R light emitting point, for example, the output is increased, but the output is reduced when it is received only from another light emitting point. Accordingly, in order to obtain accurate white balance information, it is necessary to average the image data of the image after the input with respect to a certain level of area. However, the accurate output may not be obtained due to the positional relationship between the arrangement pitches of the light emitting points in shooting and the arrangement pitches of the pixels of the imaging element 102.

Consequently, in Embodiment 1, by shooting in a defocused state, the colors of the light emitting points of the display monitor 224 become a mixed state, so that the effect which is the same as that of the averaging can be obtained.

In Step 10, it is determined whether or not the analysis data obtained in Step 9 is located within the target area TG in FIG. 6B. Namely, it is determined whether or not the chromaticity of the analysis data is within a previously set area including a certain tolerance (the value of this area is referred to as a target value Tg). If the analysis data is within the area of the target value Tg, the flow moves onto the end process of Step 8 because there is no problem with the color shift adjustment value. In the end process of Step 8, the display of the white brightness display data in the display monitor 224 is completed, and the data of the image in the imaging element 102 of the first camera unit 1 is deleted.

In Step 10, if the analysis data is outside the area of the target value Tg, the flow moves onto Step 11, and the parameter of the display monitor 224 is calculated such that the analysis data value becomes the white point WP in the center of the target area TG, and the adjusted value is rewritten. Thereafter, the flow moves onto Step 12. In Embodiment 1, the adjusted value is a value obtained by adjusting in the shipment of the camera system 3, and this value is stored in a nonvolatile memory such as the flash ROM 120 of the first camera unit 1 as an initial value. In this case, the portion which performs the processes of Steps 10, 11 corresponds to the light emitting brightness adjuster and the configuration which stores the adjusted value corresponds to a memory.

In Step 12, the adjusting image Ga based on the white brightness display data is displayed in accordance with the rewritten adjusted value, and after encouraging a user with sound or the like to perform shooting in a state in which the first camera unit 1 faces the display monitor 224 again, the flow moves onto Step 2 so as to perform the processes after Step 2.

In this case, if the rewritten adjusted value is appropriate, the analysis data obtained in Step 9 falls within the area of the target value Tg, and the end process of Step 8 is performed. If the analysis data is not appropriate, the flow again moves onto Step 11, and the processes from Step 12 are repeated after calculating and rewriting the adjusted value.

The number of adjustments, namely, the number which performs the processes after Step 11 is counted, and the number of the readjustments is limited. If the analysis data does not fall within the range of the target value Tg even if the previously set number of the adjustments is performed, it is preferable to adopt the adjusted value in which the analysis data is closest to the target value Tg, and to complete the adjustment. In this case, after the process of Step 11, a process which stores an adjusted value in which a difference with the target value Tg is smaller by comparing the previous adjusted value and the obtained adjusted value is added, and then a determination process as to whether or not the count value reaches the set value is added. If the count value does not reach the set value in this determination, the flow moves onto Step 12. If the count value reaches the set value, the flow moves onto Step 8 after rewriting into the stored adjusted value.

Hereinafter, the function of the imaging device of Embodiment 1 will be described.

The color variation and color shift of the display monitor 224 may be generated due to the deterioration in a not illustrated color filter, reflection plate, light-guiding plate and LED of a back light. If such a color shift occurs, even if the brightest white of 256 gradation (R; 255, G: 255, B: 255) is displayed, the white becomes yellowish white or reddish white.

The performance of the imaging element 102 is generally guaranteed for a predetermined time, for example, 500 hours in the brightness of Lv 12. The change in the chromaticity of the imaging element 12 due to the time degradation is small compared to the display device 224

If a user feels that white in the display monitor 224 is not white, for example, the white is yellowish or reddish due to the time degradation of the display monitor 224 as described above, the user performs the color shift adjustment.

In this color shift adjustment, a user, at first, presses the first camera unit 1 to the main body unit 2 in the arrow A direction in FIG. 1, and then the main body unit 2 is removed by sliding in the lateral direction. Then, the connectors 302, 303 are connected to the joint connectors 105, 201 of the first camera unit 1 and the main body unit 2, respectively, and both units 1, 2 are thereby connected via the connection cable 300.

Next, the power source switch 230 of the main body unit 2 is turned on, and the color shift adjustment mode is selected from a not illustrated menu screen displayed on the screen 224a.

By the selection of this color shift adjustment mode, the color shift adjustment process is started. At first, the adjusting image Ga illustrated in FIG. 5A is displayed on the screen 224a of the display monitor 224, and also the shooting parameter of the first camera unit 1 is set to the color shift adjustment mode. The black frame BW is displayed in the adjusting image Ga, and "white" in which Red, Green, Blue are displayed by previously set brightness based on the white brightness display data, and "white" corresponding to the white point WP in FIG. 6B are displayed inside the black frame BW. "White" which is displayed based on the white brightness display data is data which displays white in the screen 244a of the display monitor 22 in the shipment. However, if a color shift occurs due to the deterioration in the display monitor 244, the white displayed based on the white brightness display data becomes white having a color shift, namely, the above described yellowish white or reddish white.

Next, a user makes the lens group 101 of the first camera unit 1 face the screen 224a on which the adjusting image Ga is displayed such that the lens group 101 almost makes contact with the screen 224a, and then, presses the release switch 207 to perform shooting.

With the pressing of the release switch 207, in the camera system 3, at first, the shot image which is the image signals of the imaging element 102 is input (Step 3), and the facing determination is conducted based on this shot image (Step 4). If the first camera unit 1 does not face the screen 224a of the display monitor 224, the message Me which encourages the facing is displayed on the screen 224a as illustrated in FIG. 11 (Step 6). Then, a user changes the direction of the first camera unit 1 according to this message, and presses the release switch 207 to perform shooting again.

If the first camera unit 1 faces the screen 224a, the chromaticity analysis is performed (Step 9). Namely, the chromaticity analysis inside the black frame BW of the image is conducted.

Then, it is determined whether or not this analysis data is a value within the target area TG in the circumference of the white point WP (Step 10). As described above, the imaging element 102 hardly deteriorates compared to the display monitor 224. Consequently, if "white" based on the white brightness display data, which should be displayed as "white" corresponding to the white point WP, is displayed as yellowish white or bluish white in the display monitor 224, the analysis data of "white" shot by the imaging element 102 is analyzed as a color shifted from the white point WP.

Accordingly, if the analysis data which should be "white" is shifted from the white point WP, the adjusted value in which the value of the analysis data which should be "white" corresponds to or approximates the white point WP is calculated, and the adjusted value stored in the flash ROM 120 is rewritten to the calculated adjusted value.

The chromaticity in the display monitor 224 is changed by the rewritten adjusted value, and the chromaticity feature illustrated in FIGS. 6A, 6B is shifted in a desired direction.

Moreover, if the adjusted value is rewritten, the white brightness display data is displayed on the display monitor 224 again based on the new adjusted value (Step 12).

Therefore, a user shoots the screen 224a of the display monitor 24 by the first camera unit 1 with the same process described above, so that the analysis of "white" in the black frame BW is performed in the camera system 3 similar to the above. By repeating these processes, "white" which is displayed in the black frame BW of the screen 224a of the display monitor 224 comes closer to the white point WP. Then, if the analysis data falls within the range of target value Tg, the number of rewritings of the adjusted value becomes the set number, or a user completes the color shift adjustment, the color shift adjustment is completed, and the adjusted value is stored.

As described above, in the imaging device of Embodiment 1, the following effects can be obtained.

a) "White" which should be "white" displayed on the screen 224a of the display monitor 224 of the main body unit 2 is shot by the first camera unit 1, and the "white" is analyzed based on the obtained image data. If the "white" is shifted from the white point WP more than the set value, the adjusted value, which corrects in the direction in which the displayed "white" comes closer to "white" corresponding to the white point WP, is obtained and the adjusted value is rewritten to this adjusted value.

Therefore, a user can easily adjust the color shift of the display monitor 224 after shipment. Even if a color shift occurs due to the deterioration in the display monitor 224, the color shift can be corrected such that "white" can be accurately reproduced.

In the conventional art, when white balance is adjusted on the display monitor 224 having a color shift, if the imaging data of the first camera unit 1 is output by a display of a personal computer or a printer, a color different from a color which is expected by a user is reproduced. In this Embodiment, such color reproduction can be controlled, and a color which is close to a color which is expected by a user can be reproduced. After this color shift adjustment, if a user adjusts white balance while viewing the display monitor 224, ideal white balance adjustment with reduced color shift can be performed.

b) If a color shift occurs in the display monitor 224, the color shift amount is calculated based on the comparison of the analysis data and the target value Tg, so as to obtain the adjusted value, so that accurate correction can be conducted.

The required operations of a user are to remove the first camera unit 1 from the main body unit 2, connect both units 1, 2 by the connection cable 300, and press the release switch 207 after a user makes the first camera unit 1 face the display monitor 224. Accordingly, an operation which adjusts colors by a user's visual check is unnecessary, resulting in a good adjusting performance.

c) Since the adjustment of the color shift is performed in a state in which the first camera unit 1 faces the screen 224a of the display monitor 224, the imaging data of the first camera unit 1 can equally reproduce the chromaticity of the display monitor 224. The color shift adjustment can be performed with high accuracy compared to a case if the photographing, analyzing and adjusting are performed without the facing. In addition, the number of pixels which can be displayed in the display monitor 224 is generally less than the number of pixels of the imaging element 102, so that the adjusting image in a through image before and after the shooting operation transfers and displays data in which the shot image is thinned out. Accordingly, the facing determination is performed with the small data amount, so that the time required for the determination can be reduced.

d) The facing is performed by scanning twice the black frame BW formed by two pairs of parallel lines in the X-direction and Y-direction, so that the facing determination can be performed with high accuracy by a simple rapid process in which the control load is small.

In addition, the black frame BW becomes a mark when a user makes the first camera unit 1 face the screen 224a, and helps the user's facing operation, resulting in the improvement in the operation performance.

e) In Embodiment 1, a newly calculated adjusted value is stored in a nonvolatile memory, so that the new adjusted value can be effectively maintained, and a less color shift condition can be maintained.

f) Since the white brightness display data is displayed inside the black frame BW for the facing determination, it is not necessary to switch the display of the white brightness display data and the pattern for the facing determination, which is superior in the operation performance. Moreover, the correspondence accuracy of the white brightness display data in the display monitor 224 and the analysis data of the image signals obtained from the imaging element 102 is improved, and the color shift determination accuracy is also improved.

g) The image for analyzing a color shift is again shot in a state in which the first camera unit 1 is defocused after the facing determination, and the color shift is analyzed based on this image data. Therefore, the effects, which are the same as the effects averaging a certain area in the light emitting points of the display monitor and the pixels of the imaging element, are obtained and the accuracy of the chromaticity analysis can be further improved.

h) The facing determination values Xh, Yh are set to values having the most suitable allowable range based on the viewing direction of the display monitor 224. If the viewing direction of the display monitor 224 is inclined, the facing determination can be accurately performed in accordance with the inclination.

j) When obtaining the adjusted value based on the analysis data, if the analysis data does not fall within the target area TG although the adjusted value is rewritten by a set number, the adjustment is completed. For this reason, the generation of a problem which can not complete the adjustment by the repetition of the analysis can be prevented, and the number of rewritings of the adjusted value can be prevented from achieving the limit of the nonvolatile memory.

k) The adjusted value is stored in the first camera unit 1, and each of the camera units 1, 1' has the adjusted value. Accordingly, when exchanging each camera unit 1, 1', the adjusted value stored in each camera unit 1, 1' can be used, which is superior in the correspondence to the exchanging of the camera units 1, 1'.

The connection cable 300 as a connector connects the connectors 302, 303 to the existing joint connectors 105, 201, respectively, so that the connection cable 300 can be manufactured with low costs compared to a case in which a connection portion is added to each unit 1, 2.

Although the embodiments of the present invention have been described above, the present invention is not limited thereto. It should be appreciated that variations may be made in the embodiment described by persons skilled in the art without departing from the scope of the present invention.

For example, in Embodiment 1, an image shot in a defocused state is used for the analysis of the chromaticity, but it is not limited thereto. The chromaticity can be analyzed based on an image obtained in a focused state. In this case, an image for use in the facing determination can be analyzed, so that the operation of a user can be further simplified.

According to the embodiment of the present invention, the imaging device, the method of adjusting a color shift of the display monitor and the color shift adjuster of the display monitor, which can easily adjust the color shift of the screen of the display monitor by a user after shipment, can be provided.

As a result, when adjusting white balance while viewing the screen of the display monitor by the manual adjustment of the white balance, the white balance adjustment can be conducted in a state without having a color shift on the subject image displayed on the screen of the display monitor. Therefore, an image which is close to expected colors can be obtained when displaying the image on the screen of the personal computer and printing the image by the printer.

According to the embodiment of the present invention, a new adjusted value can be maintained until next color shift adjustment, so that a less color shift condition can be maintained.

According to the embodiment of the present invention, in the color shift adjustment, by the facing determination based on the facing determination pattern displayed on the screen of the display monitor, when the camera unit faces the screen, the adjustment by the light emitting brightness adjuster and the color information analysis by the color information analyzer are conducted.

Consequently, in the imaging element of the camera unit, the reproducibility of the image displayed on the screen can be improved, and the color shift adjustment with high accuracy can be achieved compared to a case when shooting, analyzing or adjusting is performed without the facing.

According to the embodiment of the present invention, the facing determination unit determines the facing by a simple process which scans in the orthogonal directions to each of the two pairs of parallel lines, and obtains the difference of the coordinates of the edges.

According to the embodiment of the present invention, the adjusting image based on the white brightness display data is displayed inside the two pairs of parallel lines, so that the correspondence accuracy of the analysis data of the image signal obtained from the imaging element and the white brightness display data is improved, and the color shift determination accuracy can be improved.

According to the embodiment of the present invention, the facing determination is conducted by the adjusting image which is shot after it is determined that the camera unit faces the screen, so that the color shift adjustment with high accuracy can be conducted compared to the image which is shot in a state in which the camera unit does not face the screen. The number of the pixels which can be displayed on the monitor is generally less than the number of pixels of the imaging element, so that in the adjusting image display state in the through image before and after the shooting operation, the data in which the shot image is thinned out is transferred and displayed. Since the facing determination is performed with a small data amount as described above, a time required for the determination can be reduced.

According to the embodiment of the present invention, the shooting of the adjusting image is conducted in a defocused state. By conducting the shooting in a defocused state, the effects which are the same as averaging for a certain area for the light emitting points of the display monitor and the pixels of the imaging element can be obtained, so that the accuracy of the chromaticity analysis can be improved.

According to the embodiment of the present invention, the allowable range of the facing determination is set according to the inclination of the center of the viewing direction of the display monitor, so that the facing determination can be conducted with high accuracy even if the center of the viewing direction inclines from the facing direction according to the specs of the display monitor.

According to the embodiment of the present invention, the connection unit enables the communication between the camera unit and the main body unit by fitting the connectors to the joint connectors of the units, respectively. The connection unit uses the existing joint connector, so that the configuration can be simplified compared to a case if a dedicated connector is additionally provided.

What is claimed is:

1. An imaging device, comprising:
    a camera unit having an imaging element in which subject light which has passed through a shooting optical system is formed to output an image signal;
    a main body unit from which the camera unit is detachable, the main body unit having a display monitor displaying a subject image on a screen by input image data in which the image signal is processed; and
    a communication unit which enables bidirectional communication of the camera unit and the main body unit in a state in which the camera unit is removed from the main body unit,
    at least one of the camera unit and the main body unit, including:
    a mode setting unit configured to set an adjustment mode which adjusts color shift of the subject image displayed on the screen;
    an adjusting image data output controller configured to output white brightness display data to the display monitor as the image data when the adjustment mode is set by the mode setting unit;
    a color information analyzer configured to analyze color information based on the image signal obtained from the imaging element by shooting an adjusting image displayed on the screen based on the white brightness display data by the camera unit; and
    a light emitting brightness adjuster configured to adjust RGB light emitting brightness of the display monitor based on an analysis result of the color information analyzer so as to solve the color shift on the screen.

2. The imaging device according to claim 1, wherein the light emitting brightness adjuster includes a memory configured to store an adjusted value which adjusts the light emitting brightness, and if the light emitting brightness is adjusted by the adjusting mode, rewriting to a newly obtained adjusted value is conducted.

3. The imaging device according to claim 1, wherein
    the white brightness display data includes data which displays a facing determination pattern in the adjusting image,
    the imaging device includes a facing determination unit configured to determine whether or not the camera unit is in a previously set facing state to the screen by analyzing the facing determination pattern based on an image signal output from the imaging element, and
    the adjustment by the light emitting brightness adjuster and color information analysis by the color information analyzer are conducted in the facing determination of the facing determination unit.

4. The imaging device according to claim 1, wherein
    the facing determination pattern includes a pair of parallel line patterns each of which extends in X-direction on the screen and a pair of parallel line patterns each of which extends in Y-direction orthogonal to the X-direction on the screen, and
    the facing determination unit is configured to detect edge coordinates of the parallel line patterns by scanning the subject image in the X-direction and the Y-direction, and to determine a facing state by a difference of the coordinates.

5. The imaging device according to claim 4, wherein the white brightness display data is set inside a frame formed by the two pairs of parallel line patterns.

6. The imaging device according to claim 3, comprising:
    a shooting permission device configured to permit shooting by the camera unit for loading the image signal for the color information analysis after the facing determination of the facing determination unit, wherein
    the adjustment by the light emitting brightness adjuster and the color information analysis by the color information analyzer are conducted by the image signal obtained by the shooting after the facing determination.

7. The imaging device according to claim 1, wherein the shooting optical system of the camera unit is set in a defocuses state to display of the screen when shooting the adjusting image for performing the color information analysis by the color information analyzer.

8. The imaging device according to claim 3, wherein in the facing determination unit, in a state in which a viewing direction of the display monitor is inclined to the facing direction, an allowable range of the facing determination is set larger than the direction opposite the viewing direction.

9. The imaging device according to claim 1, wherein each of the main body unit and the camera unit includes a joint connector which enables communication between the units in a state in which the camera unit is mounted on the main body unit, and the communication unit includes connectors on a cable side which are connected to the joint connectors, respectively, and a cable which connects the connectors.

10. A method of adjusting a color shift of a display monitor in an imaging device including a camera unit having an imaging element in which subject light which has passed through a shooting optical system is formed to output an image signal, and a main body unit from which the camera unit is detachable, the main body unit having a display monitor displaying a subject image on a screen by input image data in which the image signal is processed, the method, comprising the steps of:

displaying a color shift adjusting image on the screen by outputting previously set white brightness display data on the screen of the display monitor;

imaging a color shift adjusting image displayed on the screen by the camera unit;

analyzing color information based on the image signal obtained from the imaging element which shoots the adjusting image; and adjusting RGB light emitting brightness of the display monitor so as to solve the color shift of the subject image which is displayed on the screen based on an analysis result of the color information.

11. A color shift adjuster of a display monitor in an imaging device including a camera unit having an imaging element in which subject light which has passed through a shooting optical system is formed to output an image signal, a main body unit from which the camera unit is detachable, the main body unit having a display monitor displaying a subject image on a screen by input image data in which the image signal is processed, and a communication unit which enables bidirectional communication of the camera unit and the main body unit in a state in which the camera unit is removed from the main body unit, the color shift adjuster, comprising:

an adjusting image data output controller configured to display an adjusting image on the screen by outputting previously set white brightness display data on the display monitor in color shift adjustment;

a color information analyzer configured to analyze color information based on the image signal obtained from the imaging element by shooting the adjusting image with the camera unit; and a light emitting brightness adjuster configured to adjust RGB light emitting brightness of the display monitor so as to solve color shift of the subject image which is displayed on the screen based on analysis result of the color information by the color information analyzer.

* * * * *

UNITED STATES PATENT AND TRADEMARK OFFICE
CERTIFICATE OF CORRECTION

| | | |
|---|---|---|
| PATENT NO. | : 8,532,378 B2 | Page 1 of 1 |
| APPLICATION NO. | : 13/178923 | |
| DATED | : September 10, 2013 | |
| INVENTOR(S) | : Takahiro Sawada | |

It is certified that error appears in the above-identified patent and that said Letters Patent is hereby corrected as shown below:

On the title page, Item (30), the Foreign Application Priority Data has been omitted. Item (30) should read:

--(30)  Foreign Application Priority Data

Jul. 12, 2010    (JP).......................2010-157575--

Signed and Sealed this
Twenty-fifth Day of February, 2014

Michelle K. Lee
*Deputy Director of the United States Patent and Trademark Office*